United States Patent [19]

Abraham

[11] 4,029,905

[45] June 14, 1977

[54] APPARATUS FOR DETECTING THE RHYTHM OF AN NRZ MESSAGE

[75] Inventor: Michel Abraham, St Michel sur Orge, France

[73] Assignee: Compagnie Industrielle des Telecommunications Cit-Alcatel, Paris, France

[22] Filed: Nov. 17, 1975

[21] Appl. No.: 633,017

[30] Foreign Application Priority Data

Nov. 25, 1974 France .............................. 74.38586

[52] U.S. Cl. ................................. 178/88; 178/69.1
[51] Int. Cl.² ............................................ H04I 7/00
[58] Field of Search ............... 178/69.5 R; 328/155; 178/88; 340/167; 179/15 BA

[56] References Cited

UNITED STATES PATENTS

| | | | |
|---|---|---|---|
| 3,593,160 | 7/1971 | Moore | 178/69.5 R |
| 3,621,140 | 11/1971 | Griffiths | 328/155 X |
| 3,747,067 | 7/1973 | Fox | 178/69.5 R |
| 3,778,550 | 12/1973 | David | 178/69.5 R |
| 3,789,303 | 1/1974 | Hoffman | 178/69.5 R |
| 3,819,853 | 6/1974 | Stein | 178/69.5 R |
| 3,932,705 | 1/1976 | Wulleman | 178/88 |
| 3,953,674 | 4/1976 | Fletcher | 328/155 X |

Primary Examiner—Harold I. Pitts

[57] ABSTRACT

The device comes within the branch of digital transmission and refers more particularly to the problem of the recognition of a message coded in the "no return to zero" code, which is usually rhythmed by a given frequency. According to the invention, a phase-locked loop is provided for reconstituting the original rhythm from the message, and a phase shifter having an instantaneous action is additionally provided in that loop. The analysis of the reaction of the loop after that phase shift, by means of integrators, gives a statistical data information on the existence of a message. The invention applies more particularly to very noisy NRZ transmission lines.

6 Claims, 3 Drawing Figures

APPARATUS FOR DETECTING THE RHYTHM OF AN NRZ MESSAGE

BACKGROUND OF THE INVENTION

The invention belong to the branch of electronic devices and more particularly solves the problem of the recognition of a digital message coded in NRZ code ("no return to zero") and rhythmed by a given frequency.

The NRZ code which is often used in digital transmission is a binary code (hence a code having two levels) rhythmed by a clock, in which the levels, respectively 1 and 0, are maintained for successive bits having the same value (1 or 0), a change in level therefore taking place for two successive bits having different values. In the NRZ code, the duration of a bit is equal to the period of the clock defining the rhythm. It is necessary, for a message thus coded to be decoded, to know the frequency and the phase of the original rhythm. An article published in IEEE Transactions on Communications Vol. COM 20 Nr. Apr. 2, 1972, pages 94 to 104, describes a system for reconstituting the rhythm for an NRZ message, from the received message exclusively, and wherein the contingent errors due to the transmission of the message are taken into account by an appropriate statistical treatment.

In the known system, if the frequency of the message is known, an attempt is made to lock the phase of a local oscillator to the phase of the supposed NRZ message. The fact that a locking is obtained could indicate that there is a message. Practice has shown that such a principle gives a satisfactory result for recognition of the message only when the signal-to-noise ratio is high and when the frequency of the rhythm of the message is very stable. Now, these two conditions are rarely fulfilled in the case of long-distance transmission and more particularly in the case of a transmission by satellite.

SUMMARY OF THE INVENTION

The invention aims at overcoming that disadvantage. It refers to a digital device for recognizing an NRZ message rhythmed by a given frequency, containing a transition detector which generates a pulse for each change in binary polarity, and a phase comparator which compares the phase of the pulses whith the phase of a local clock and produces pulses which are used for an advance a delay control respectively of the local clock, so that this latter tends to be phase locked with the polarity change pulses.

In such a device, the invention is characterized in that the control pulses are, moreover, applied to an integrator assembly which counts the advance and the delay control pulses and which sends out a signal indicating that there is a message when the number of advance control pulses reaches a given threshold, the number of delay control pulses being taken into account. The local clock is provided with a phase shifter which effects a fixed and sudden phase of shift that clock at the time when the integrating of the advance control pulses begins.

Instead of observing the stable state of the phase-locked loop, a recognition of the existence of a message according to the invention is obtained by applying an artificial phase shift on the local clock and by digitally analysing the transient state subsequent to that shift.

Preferably the part of the integrator assembly, which counts the delay pulses is provided with means for blocking the sending out of the said signal that indicates the existence of a message, when the ratio between the number of delay control pulses and the number of advance control pulses reaches a given threshold.

In a particular embodiment of the invention, three counters are inserted between the outputs of the comparator and the inputs of the integrator assembly and of the local clock, in such a way that the first two counters add up the pulses indicating a phase advance and a phase delay, respectively, and the third adds up all the advance and delay pulses. The first two counters send out an advance control pulse and a delay control pulse respectively for the local clock and the integrator assembly when they reach a counting state N, and the resetting to zero of all the three counters is effected when one of them reaches the state N and M respectively, for the third counter (N <M< 2N).

For certain applications, use could be made of the speed of control which is obtained without the counters, and of the high sensitivity of the control which is appreciated for the analysis of the message, by short-circuiting temporarily the three counters by appropriate logic gates.

In a particularly simple embodiment of the device according to the invention, a sequencer which defines fixed and repeated measuring cycles is provided, controlling, firstly, a phasing of the clock then the phase shift thereof, and lastly the reading of the result following from the state of the double integrator.

Although the device according to the invention is based on a previous knowledge of the frequency of the message, it could usefully be applied in a case where the frequency is not known. In that case, an oscillator having an adjustable frequency is provided as the local clock; this oscillator scans step by step a given frequency band and makes it possible, at each step, to effect several measuring cycles. Lastly, for each frequency step, the number of recognitions of an NRZ message is recorded. That number is small and relatively constant for all the frequency steps where there is no message, whereas when there is a message, for certain frequencies, a very much higher number of recognitions is obtained. These frequencies represent the rhythm of the message sought (fundamental, harmonics and certain sub-harmonics). As will be seen hereinbelow, the number of recognitions of messages is the highest for the frequency sought.

BRIEF DESCRIPTION OF THE DRAWINGS

The invention will be described in greater detail hereinbelow with reference to the drawings, wherein.

DESCRIPTION OF THE PREFERRED EMBODIMENT

Figure 1:
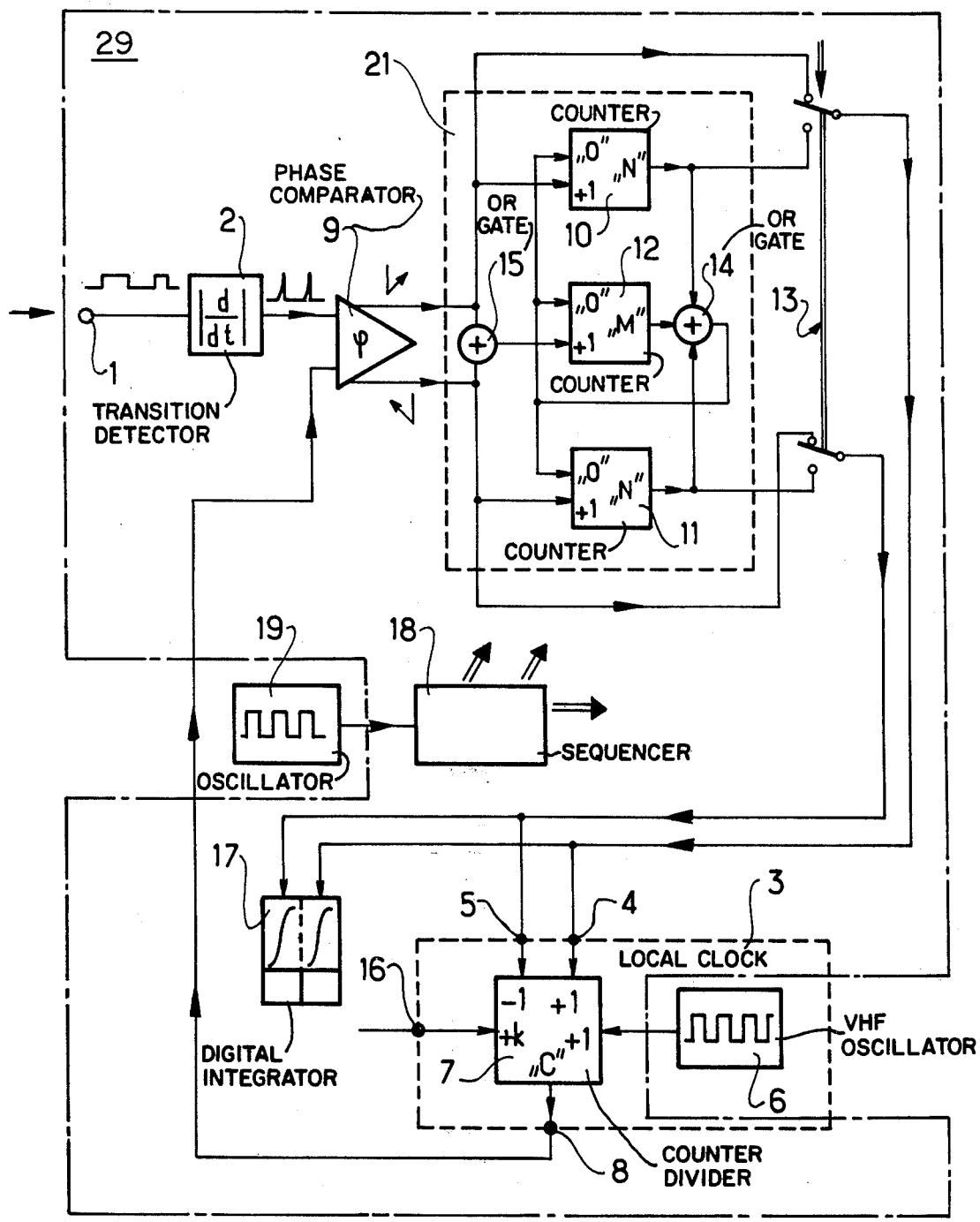
FIG. 1 shows a schematic diagram of an apparatus according to the invention.

FIG. 1 shows a schematic illustration of a device or apparatus for the recognition of an NRZ message rhythmed by a known frequency. An input signal to be analysed is applied to an input 1. It is supposed that this signal has already passed through a digital discriminator and therefore comprises one of the two possible levels (1 and 0) and shiff transitions. The signal is applied firstly to a transition detector 2 which sends out a pulse for each transition of the input signal, that pulse having a negligible width in relation to the half-period of the NRZ rhythm sought. The pulse will be called hereinbelow the transition pulse.

The transition pulses constitute the input of a phase locked loop for a local clock 3, whose frequency is identical to that of the rhythm of the message sought. The controlling of the clock or oscillator 3 is effected in two directions, that is, by an advance of the phase or a delay of the phase; to do this, there are two control inputs 4, 5 of that clock. In practice, the local clock 3 can consist of a very high frequency oscillator 6 and a counter-divider 7 which is used for demultiplying the frequency of the oscillator. The control inputs 4 and 5 affect that counter-divider by bringing in an extra counting pulse or by blocking it during a period of the oscillator. The output 8 of the counter-divider constitutes the output of the clock 3 and supplies, in case of the locking of the phase, a train of pulses reconstituting the rhythm of the message which reaches the input 1.

The phase-locked loop comprises, besides the local clock 3, a phase comparator 9 which receives on the one hand the transition pulses of the transition detector 2 and on the other hand the pulses leaving the local clock through the outputs 8. That comparator comprises two outputs, one of which sends out a pulse when the transition pulses of the signal are ahead of the positive transition of the clock and the other of which sends out a pulse when the situation is opposite. When a signal having a cyclic ratio of ½ is chosen for the local clock, the comparator only has to check if the transition pulse coincides with the high level or the low level of the local clock.

In a first embodiment of the invention, the pulses leaving the comparator 9, directly applied as control pulses to the inputs 4 and 5 of the local clock 3. It is evident that in the case of locking, there are alternatively advance and delay control pulses, and that in the case of a phase difference, there are only advance or delay control pulses. Taking into account the jitter or in general the noise, in reality, a certain number of delay control pulses and vice-versa are, however, observed.

In the phase-locked loop, the control pulses effect a phase shift of the local clock 3 through a fixed angle which is independent from the value of the phase difference and which depends only on the demultiplication obtained in the counter-divider 7.

It has already been proposed, in the above-mentioned article, to increase the sensitivity of such a phase-locked loop by inserting therein, three counters 10, 11 and 12. These counters together constitute an assembly 21. In the example of FIG. 1, the insertion is obtained by operating a double switch 13 by which the direct connections are interrupted between the outputs of the comparator 9 and the inputs 4, 5 of the local clock 3, and these connections are instead connected to the outputs of the counters 10 and 11. The counters 10 and 11 have an identical structure and send out, on respective outputs, a pulse after N pulses applied to a counting input which is symbolically shown by the notation +1. An input for resetting to zero is symbolically shown by 0. The third counter 12 has an identical structure except that it sends out a pulse only after M input pulses, M being greater than N and smaller than 2N.

The resetting to zero of the three counters is obtained simultaneously by a pulse leaving an OR gate 14 whose inputs are connected to the outputs of the three counters 10–12. Consequently, when one of the counters reaches its final state, all three are immediately reset to zero.

The counting input of the counter 10 is connected to the advance output of the comparator 9, the counting input of the counter 11 is connected to the delay output of the comparator 9, and the counting input of the counter 12 is connected through an OR gate 15 to the two outputs of the comparator 9.

With the switch 13 in its "low" position, the operation of the control loop is identical to that described in the earlier-mentioned article. "Low" and "high" positions of the switch 13 relate to the positions as can be seen in FIG. 1 of the drawings, the schematic diagram showing the "high" position. In the case of locking, the counter 12 arrives at the end of the counting faster than the other two counters and resets the three counters to zero without there being any control pulses at either input 4, 5 of the local clock 3. M and N are chosen in such a way that the effects of the noise no longer have any effect on the local clock.

In the case of a phase difference between the local clock and a message at the input 1, the counter 10 or 11 is filled more rapidly than the counter 12, and a control pulse is applied to the input 4 or 5 of the local clock, before the three counters are reset to zero and begin to count again.

To be able to recoginse accurately the existence of an NRZ message in such a device, even when there is a considerable noise, it is proposed, according to the invention, to analyse the transient state of the phase-locked loop after a forced phase shift of the clock 3. That phase shift is brought about through an input 16 of the local clock and can be obtained by a subtraction of $k$ units at the momentary state of the counter-divider 7. In practice, the passing of the counter-divider 7 through the state $k$ is waited for to force it suddenly into the original state. Evidently, $k$ can be displayed at the user's will. Preferably, a value is chosen which corresponds to a phase-shift value between 90° and 160°.

As will be described later in detail, the phase shift is brought in only after a waiting time corresponding to a contingent locking. If, before the phase shift, there are practically no control pulses at the input 4, 5 of the local clock 3, the phase shift immediately produces control pulses on one of the two inputs 4, 5. Let it be assumed that such a phase shift has been effected, and that correction pulses arrive at the input 4.

The analysis of the transient state is mainly made in a digital integrator assembly 17 having two integrators, which integrates separately the advance and the delay control pulses. When there is a message and no noise, the number of pulses of the advance orders depends only on the phase shift value $k$. It is then sufficient, to recoginze a message, to read the integration state of the advance pulses after a fixed time, counted from the moment when the phase shift was applied.

When there is no message and no noise, the two integrators remain empty during that fixed measuring time. When there is no message but there is noise, the two integrators receive practically the same number of pulses.

It is therefore sufficient to look at the state of integration of the two integrators to be able to conclude whether there are any messages or whether there are none and, even, how much noise there is.

The device described hereinabove is completed by sequencer 18 which is controlled by another oscillator 19 which can be identical to the oscillator 6. The sequencer defines consecutively three functional periods:

A — Preliminary locking. During that period, the switch 13 is in its "high" position for accelerating the locking. The integrators 17 are blocked. That period is chosen in such a way that there is a great probability of locking in the case of presence of a message.

B — Measuring time. At the beginning of that time, the state of the switch 13 is changed, the integrators 17 are reset to zero, and a fixed phase shift is applied to the local clock 3 by the input 16.

C — Reading period. During that short period, the state of the integrators 17 is read and the conclusions are deduced therefrom.

When the sequencer has ended a cycle, it begins a new one immediately.

Figure 2:
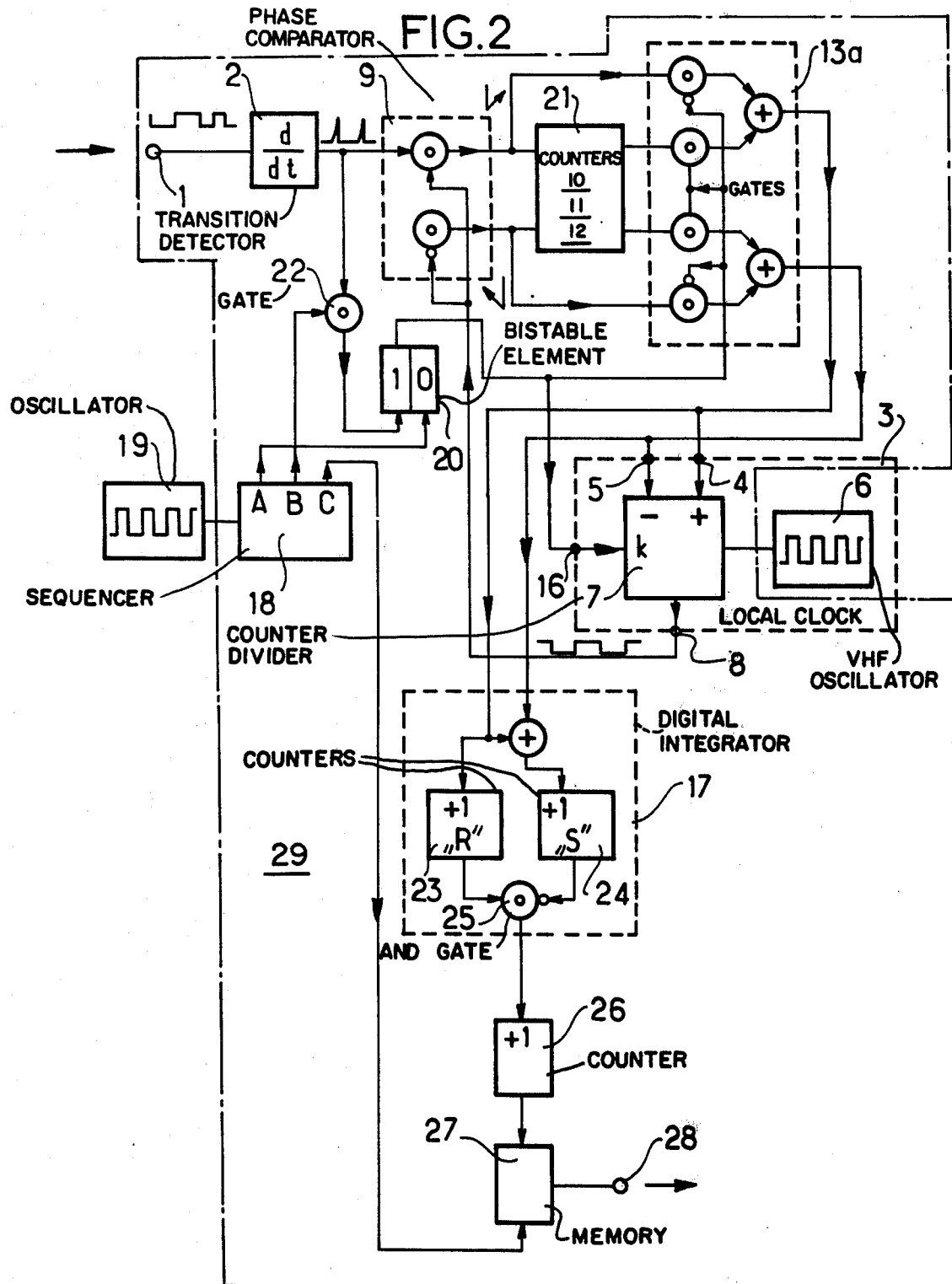
FIG. 2 shows a more elaborate diagram of the apparatus.

In FIGS. 1 and 2, the entire circuitry is designated by numeral 29, for further reference to be used in FIG. 3, however without the oscillators 6 and 19, as will be explained.

Now, with reference to FIG. 2 which shows a diagram of the same device or apparatus but which is a little more elaborate, it will be seen that the switch 13 is replaced by a set of AND, NAND, NOR gates generally designated 13a whose operation is controlled by a bistable element 20. That element is reset to zero by the sequencer 18 at the beginning of each analysis cycle. In that state, it makes it possible to short-circuit the assembly 21 formed by the three counters 10–12. The bistable element 20 is reset to its opposite state at the beginning of the measuring period by means of a gate 22 which receives both the transition pulses leaving the transition detector 2 and the pulses from the sequencer 18. The output of that gate 22 affects an input of the bistable element 20, to start up, through the bistable element 20 and the input 16 of the clock 3, the dephasing, and inserts the assembly 21 formed by the three counters in the loop.

The integrator assembly 17 according to FIG. 1 comprises two counters 23, 24, one of which 23, counts the advance control pulses and the other counts the advance and the delay control pulses. By a suitable choice of the counting capacity of the two counters, the date concerning the existence of a message can be directly extracted from the counter 23, which is blocked by the output of the counter 24. An output logic element is constituted by a single AND gate 25. The output of the gate 25 is applied to a counter 26 and the latter transfers its state at the end of the measuring time to a result memory 27 which receives from the sequencer 18 the reading order and which holds the result on the output 28 at the disposal of the user.

Figure 3:
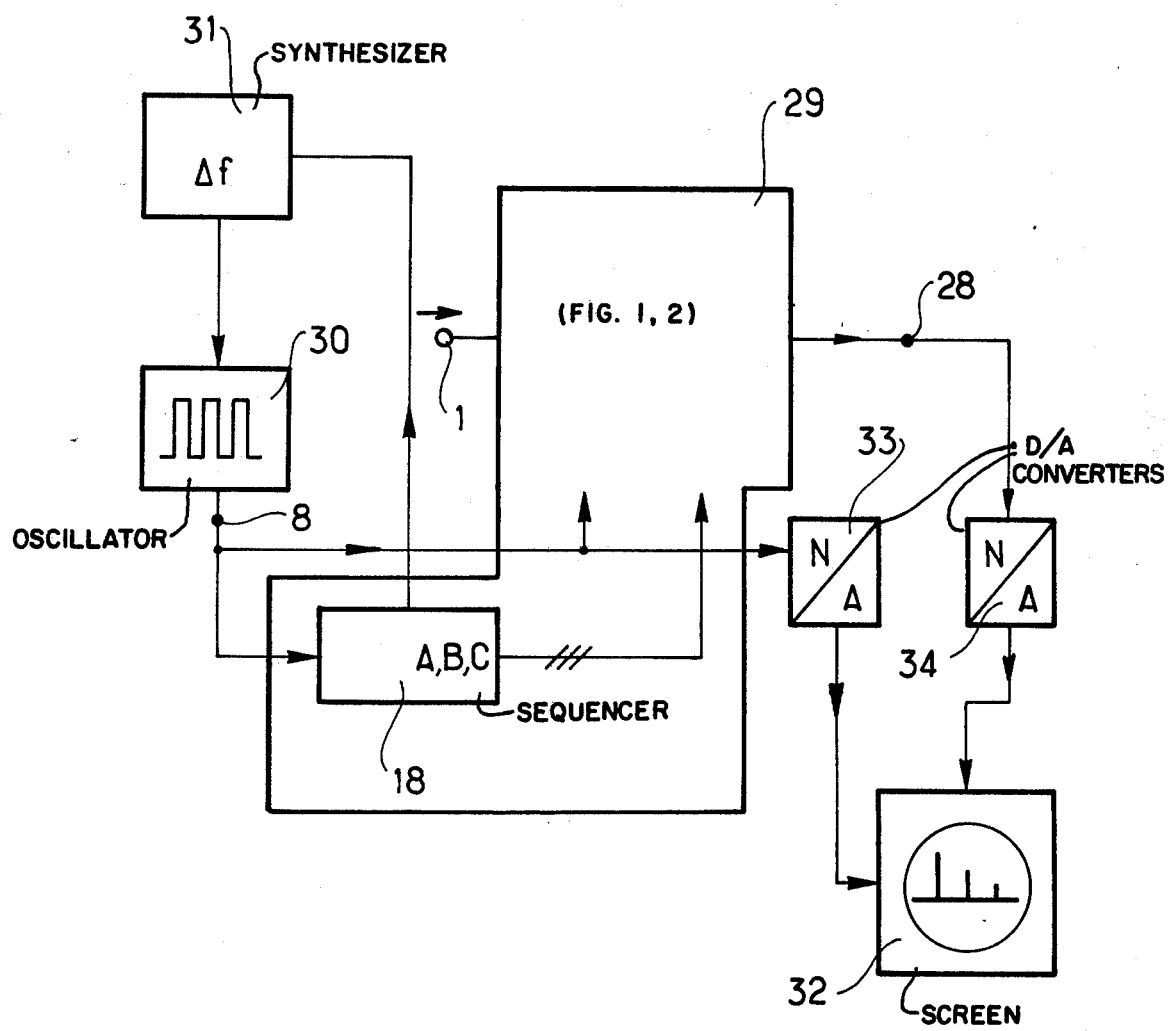
FIG. 3 shows parts of the apparatus for to the recognition of a message whose frequency is unknown.

Lastly, FIG. 3 shows an application of the device according to FIG. 1 or FIG. 2 to a system for recognizing an NRZ message whose rhythm is within a given frequency band but where the frequency is unknown. The circuit according to FIGS. 1 or 2 is shown in FIG. 3 by the box 29, having the output 28, with the exception of the oscillators 6 and 19. These are replaced, here, by an oscillator or a frequency synthesizer 30 having digital control. In a digital control circuit for a synthesizer 31, the scanning step is displayed, as is the frequency band to be scanned, and a scanning program is established. The synthesizer 31 therefore scans the frequency band in question step by step, and the result obtained in the memory 27 (see FIG. 2) is displayed for each frequency step.

This variant also allows operation by visual display on a screen 32 which receives in the abscissae through digital-to-analog converters 33 and 34, the steps in the frequency band, and in the ordinates, the result corresponding to the consecutive steps. When there is a message, lines appear on the screen, the greatest of these corresponding to the frequency of the rhythm of the message. When there is no message, there is no line if the capacities of the various counters are suitably chosen.

Experiments have shown that a distinction between good and bad quality of the signal is possible. When the quality is too poor for it to be used, it is possible, by an appropriate choice of the capacities, to recognize such a signal as noise. The length of the measuring period can also be varied.

Experience has shown, moreover, that in the case of the analysis of a pseudo-random or random NRZ code, the sub-harmonics of the rhythm of the message were practically undetectable.

The invention is not limited to the examples of embodiment described in detail with reference to the figures. It is possible, more particularly, without going beyond the scope of the invention, to modify the logic structure, complement the digital notions according to Boole's algebra or modify the loop, while the inventive principles are maintained, these being, namely, the digital analysis of the transient state after a sudden phase shift of the local clock. If the quality of the signal is very good, it may be an advantage to dispense with certain statistical counters so as to increase the speed of reaction.

I claim:

1. An apparatus for detecting the rhythm of an NRZ message, comprising: a binary-level transition detector (2) for receiving the message and delivering a pulse for each change in binary polarity; a phase-controllable local clock oscillator (3, 6) for delivering clock pulses at the rhythm of the message: a phase comparator (9) for comparing the phase of the clock pulses with the phase of the pulses delivered by said transition detector, and in turn delivering control pulses that selectively advance and delay the phase of said clock oscillator; an integrator assembly (17, 23–25) for integrating the control pulses and sending out a signal indicating the existence of a message when the number of advance control pulses reaches a first threshold, the number of delay control pulses remaining under a second threshold; and a command unit (18, 19) for defining cyclically groups of three operating periods, the first one for phase locking of said clock oscillator, the second being initiated by a sudden phase shift of said clock oscillator and the operation of said integrator assembly, and the third period being reserved for reading and evaluating the state of said integrator assembly, selectively in accordance with the presence and absence of a message.

2. The apparatus as defined in claim 1, further comprising means (25), electrically connected to a section (24) of said integrator assembly (17), which section serves to count the delay control pulses, for blocking the sending out of the message indicating signal.

3. The apparatus as defined in claim 1, further comprising three counters (10, 11, 12, 21) inserted between the outputs of said phase comparator (9) and the inputs of said integrator assembly (17, 23-25) as well as of said clock oscillator (3) in such a way that the first two counters (10, 11) add up the pulses, respectively indicating the phase advance and the phase delay, and the third counter (12) adds up all the advance and delay pulses; said first two counters sending out respectively the advance control pulses and the delay control pulses to said clock oscillator and said integrator assembly when said two counters reach a particular counting state, and the resetting to zero of all said counters is effected when of them reaches a first predetermined state, selectively for said first two counters, and a second predetermined state for said third counter, wherein the count of the second state is smaller than the twofold count value of the first state, while the latter count is smaller than that of the second state.

4. The apparatus as defined in claim 3, wherein said counters (10, 11, 12, 21) are provided with gates (13a) for short-circuiting said counters and for applying the control pulses that are delivered by said phase comparator (9) for directly controlling said clock oscillator (3).

5. The apparatus as defined in claim 1, wherein said command unit incorporates a sequencer (18) for defining fixed and repeated measuring cycles by controlling firstly the phasing of said clock oscillator (3), then a phase shift of the latter, and lastly the reading of the results in the form of the state of said integrator assembly (17, 23-25).

6. The apparatus as defined in claim 7, wherein the frequency of NRZ message is unknown, further comprising an oscillator (30) having a controlled input and means (31) to adjust its frequency, said oscillator constituting said clock oscillator, for scanning a frequency band within which falls the message, step by step after each group of the three operating periods, and allowing several measuring cycles to be performed at each step, and means (32-34) for displaying and optionally recording in each step the number of recognized messages.

* * * * *